Patented Apr. 16, 1946

2,398,481

UNITED STATES PATENT OFFICE 2,398,481

PROCESS FOR CATALYZED ABNORMAL ADDITION REACTIONS

William E. Vaughan and Frederick F. Rust, Berkeley, Calif., assignors to Shell Development Company, San Francisco, Calif., a corporation of Delaware No Drawing. Application February 23, 1942, Serial No. 432,049

8 Claims. (Cl. 204—163)

This invention relates to an improved method for the addition of hydrogen halides, hydrogen sulfide and/or mercaptans to symmetrical or unsymmetrical organic compounds containing one or more unsaturated linkages of aliphatic character. In one of its more specific embodiments, the invention pertains to a novel method of effecting a controlled reaction between a hydrogen halide (particularly hydrogen bromide), hydrogen sulfide or a mercaptan, and unsymmetrical organic compounds containing at least one unsaturated linkage of aliphatic character, i. e. an olefinic or acetylenic bond, to produce addition products of predetermined character.

It is known that hydrogen halides may be added to unsaturated hydrocarbons and to various unsaturated derivatives thereof. In fact, in 1870, Markownikoff stated that "if an unsymmetrical hydrocarbon combines with a halogen acid, the halogen adds to the carbon atom with fewer hydrogen atoms, i. e. to the carbon atom which is more under the influence of other carbon atoms." The same investigator further determined that when a hydrogen halide is added to a halogenated unsaturated compound such as vinyl chloride or a chlorinated propylene (i. e. to unsaturated hydrocarbons wherein one of the unsaturated carbon atoms carries a halogen atom, or wherein these unsaturated carbon atoms contain dissimilar numbers of halogen atoms directly attached thereto), the halogen atom of the hydrogen halide will add to the double bonded (unsaturated) carbon atom which carries the greater number of halogen atoms, while the hydrogen atom of the hydrogen halide molecule attaches to the adjacent unsaturated carbon atom. The above type of hydrohalogenation is termed "normal" to distinguish it from the "abnormal" addition of a hydrogen halide, in which latter case the hydrogen and halogen atoms are added in positions which are interchanged with respect to addition according to the above-outlined Markownikoff rule.

It is also known that mercaptans and thio-ethers may be produced by reacting hydrogen sulfide or a suitable mercaptan with an unsaturated organic compound, e. g. unsaturated hydrocarbon, at elevated temperatures in the approximate range of from 200° C. to 750° C. In some cases such reactions were effected at superatmospheric pressures. When hydrogen sulfide is reacted with unsaturated organic compounds under the outlined conditions, the sulfhydryl group attaches to the unsaturated carbon atom containing the lesser number of hydrogen atoms attached thereto, so that, as clearly brought out by Jones and Reid (Journal American Chemical Society, volume 60, pp. 2452–2455) the addition takes place according to Markownikoff's rule. Therefore, when terminally unsaturated olefins are thus reacted with hydrogen sulfide, the reaction product predominates in secondary mercaptans and/or secondary thio-ethers. When the unsaturated organic compounds have been reacted with the mercaptans at the aforementioned elevated temperatures, the sulfur of the mercapto radical attached predominantly to the unsaturated carbon atom holding the most hydrogen atoms so that this addition was contrary to the course suggested by the Markownikoff rule. This condition was designated as "abnormal" addition on the assumption that mercaptans should add like halogen acids. With reference to the addition of mercaptans to unsaturated organic compounds, it is known that the abnormal addition may be catalyzed by free oxygen, air, ozone, peroxides, ascaridole and the like, while compounds of the type of hydroquinone and piperidine act as reaction inhibitors.

Various methods have been proposed for controlling the addition of hydrogen halides so as to form reaction products in which hydrogen halide has been added contrary to the above Markownikoff rule. For instance, it has been proposed to effect the hydrohalogenation reaction in the presence of various peroxides as well as of compounds of the type of oxygen, air, or ozone, all of which tend to form peroxides when contacted with unsaturated hydrocarbons. Also, it has been found that hydrogen bromide may be added to the unsaturated organic compounds in a manner contrary to Markownikoff's rule by effecting the reaction under the deliberate influence of ultra-violet radiations, particularly those having wave-lengths below about 2900 to 3000 Angstrom units. Similarly, according to a recent discovery, hydrogen sulfide may be added to unsaturated organic compounds, contrary to the course suggested by the Markownikoff rule, by effecting the reaction at normal temperatures or even at considerably lower temperatures, under the deliberate influence of ultra-violet radiations having wave-lengths of below about 2900 to 3000 Angstrom units. It is known that the presence of peroxides or of peroxide-forming compounds in unsaturated organic compounds, e. g. unsaturated hydrocarbons, is undesirable. As to the abnormal addition of hydrogen halides such as hydrogen bromide or of hydrogen sulfide and/or mercaptans to unsaturated organic compounds under the deliberate influence of ultra-violet rays, such processes necessitate the use of special equipment which is capable of transmitting rays of the defined low wave-lengths. In other words, in order to effect the desired reaction it is necessary to employ reaction vessels and/or lamps of quartz or other suitable materials, e. g. calcium fluoride, which are capable of transmitting the defined short wave-lengths of 2900 to 3000 Angstrom units, and below.

It has now been discovered that unsaturated organic compounds of the class more fully described hereinbelow may be reacted with hydrogen halides, and more particularly hydrogen bromide, or with hydrogen sulfide or mercaptans, to effect directional addition thereof via the above-defined "abnormal" addition, this reaction being effected without the necessity of resorting to high temperatures and/or elevated pressures, and in the absence of undesirable peroxides or peroxide-forming compounds. It has also been discovered that this reaction according to this invention may be effected without the necessity of employing any special equipment or apparatus capable of transmitting very low ultra-violet rays, such as radiations having wave-lengths of 2900 to 3000 Angstrom units, and below. According to the present process, this abnormal addition of mercaptans, hydrogen sulfide, and/or hydrogen halides such as hydrogen bromide, is attained by effecting the reaction under irradiating conditions (and particularly under the deliberate influence of rays which will not otherwise dissociate any one of the reactants), and in the presence of certain catalysts having definite and specific characteristics which promote the abnormal addition but the presence of which in the unsaturated organic compounds is not detrimental. Generally speaking, these catalysts or reaction sensitizers comprise carbonylic compounds which absorb light and which may thus be decomposed photo-chemically by radiations having wave-lengths of about 2900 to 3000 Angstrom units and above.

It has also been discovered that catalysts or sensitizers of the class more fully described herein and consisting of or comprising carbonylic compounds of the type defined hereinbelow will catalyze and control the reaction between an unsaturated organic compound and a mercaptan, hydrogen sulfide or a hydrogen halide such as hydrogen bromide, so that the reaction will occur via the so-called "abnormal" addition at ordinary or even subnormal temperatures and without the necessity of employing special equipment or apparatus which will transmit ultra-violet radiations having wave-lengths of 2900 to 3000 Angstrom units, or below.

Broadly stated, the present invention resides in a photo-chemical process of effecting the addition of suitable mercaptans, hydrogen sulfide or hydrogen halides in the presence of carbonylic compounds and under the deliberate influence of light capable of photo-chemically dissociating said catalyst or sensitizer, this reaction being effected at normal temperatures, i. e. in the neighborhood of about 25° C. to about 15° C. or even considerably lower temperatures. As stated, this photo-chemical addition, according to the present invention, occurs contrary to the course suggested by Markownikoff for the addition of hydrogen halides, and in accordance with the rule proposed by Posner (Berichte, vol. 38, p. 646 (1904)) concerning the addition of mercaptans to double bonds.

The unsaturated organic compounds which may be treated according to the process of this invention include hydrocarbons containing one or more olefinic and/or acetylenic linkages. Examples of such hydrocarbons are ethylene, propylene, butene-1, butene-2, isobutylene, pentene-1, pentene-2, hexene-1, 4-methyl-pentene-1, 4,4-dimethyl-pentene-1, 4-methyl-pentene-2, octene-1, decene-1, cetene-1, styrene, cyclohexene, 3-methyl-cyclohexene, 1,4-diphenyl butene-2, butadiene-1,3, pentadiene-1,3, pentadiene-1,4, hexadiene-1,5, hexadiene-1,4, acetylene, propyne, butyne-1, pentyne-2, hexyne-1, cetyne-1, octyl-acetylene, phenyl-acetylene, cyclopentadiene, and the like. The above compounds, and their various homologues, may be substituted in the nucleus and/or in the substituents in various degrees. For instance, the unsaturates may contain one or more halogen atoms attached to saturated and/or unsaturated carbon atoms. Representative examples of these compounds are: vinyl halides, allyl halides, crotyl halides, methallyl halides, and the like. Other examples of substituted unsaturated hydrocarbons are methyl acrylate, methyl methacrylate, divinyl ether, diallyl ether, dimethallyl ether, and the like.

A particularly suitable group of organic compounds which may be reacted with mercaptans, hydrogen sulfide or hydrogen bromide via abnormal addition comprises the compounds, and particularly the hydrocarbons, in which the unsaturated linkage is in terminal or alpha position. Also, aliphatic hydrocarbons and their various substituted derivatives, e. g. halo-substituted derivatives, containing unsaturated linkages both in alpha and omega positions (i. e. terminal positions), may be readily reacted with the above-outlined compounds, via abnormal addition, to produce compounds in which both terminal carbon atoms have halogen, sulfhydryl, or mercapto radicals attached thereto. Another group of organic compounds which may be employed as the primary material comprises or includes organic compounds wherein an olefinic linkage is in non-terminal position between two carbon atoms having a dissimilar number of hydrogen atoms attached to each of said unsaturated carbon atoms due, for example, to various substituents attached thereto. For instance, the double bond may be between two carbon atoms which are of secondary and tertiary character, respectively. Another example is a compound in which the unsaturated carbon atoms are both primary or both secondary, but have unequal numbers of halogen atoms, such as chlorine, bromine, fluorine and/or iodine atoms attached to them.

Although the above unsaturated organic compounds may be reacted via abnormal addition with other hydrogen halides, it has been discovered that these unsaturates may be most readily reacted, in accordance with the process of the present invention, with hydrogen bromide to produce brominated compounds wherein the bromine atoms have been added contrary to the Markownikoff rule. As to the mercaptans which may be used, any sufficiently stable mercaptan is suitable as a reactant to be employed in the photochemical addition thereof to the above-defined class of unsaturated organic compounds. A suitable mercaptan may contain one or more sulfhydryl groups or radicals, and be of alkyl, aralkyl, alkenyl, aralkenyl or aryl character. The mercapto redical may be linked to an aliphatic or an aromatic carbon atom. In the majority of cases it is preferable to employ the normal or iso alkyl chain mercaptans of primary, secondary or tertiary character, particularly those contained or derived from petroleum and petroleum products. The methyl, ethyl, butyl, amyl, hexyl, heptyl, octyl and the like mercaptans, as well as their homologues, analogues and substitution products, may be employed with excellent results. Another group of mercaptans which may be employed as one of the two reactants comprises or includes the dimercaptans, and particularly the polymethylene dimercaptans of the general formula $HS(CH_2)_nSH$. This group of mercaptans may be reacted with, for example, aliphatic hydrocarbons containing a plurality of unsaturated linkages to produce thio-ethers having a high molecular weight.

As stated, the substances which may be used as catalysts or sensitizers for the above-outlined reaction in which mercaptans, hydrogen sulfide or hydrogen halides are added via abnormal addition, comprise the carbonylic compounds, and particularly those which may be dissociated or decomposed photo-chemically by means of rays having wave-lengths of about 2900 to 3000 Angstrom units, and longer. Without any intention of being limited by the compounds enumerated herein, it may be stated that representative compounds of this class include: aliphatic and aromatic ketones, such as acetone, methyl ethyl ketone, methyl n-propyl ketone, methyl isopropyl ketones, diethyl ketone, ethyl n-propyl ketone, methyl n-butyl ketone, dipropyl ketone, acetophenone, and their homologues; aldehydes, such as acetaldehyde, propionaldehyde, isobutyraldehyde, benzaldehyde, and the like, and their homologues; and acid halides, for example, acetyl bromide, propionyl bromide, and the like. It is to be understood that there is no intention of contending that all carbonylic compounds which are dissociable by light may be employed equally effectively as catalysts or sensitizers for the described abnormal addition of mercaptans, hydrogen sulfide or hydrogen halides, e. g. hydrogen bromide. For example, some of these carbonylic compounds, in order to be dissociated, may require radiations of much shorter wave-lengths than those necessary for the decomposition of other carbonylic compounds. Also, the rate of chain initiation of some carbonylic compounds, although they may be readily decomposed photo-chemically by radiations of wave-lengths above 2900 Angstrom units, is considerably slower than the rate of chain initiation of other carbonylic compounds. This may be due to steric hindrance or even resonance in the radical formed during the decomposition. Nevertheless, it may be generally stated that all carbonylic compounds, and particularly the ketones, aldehydes and acid aldehydes, which are capable of being dissociated by light having wave-lengths of about 2900 to 3000 Angstrom units, and longer, may be effectively used as catalysts or sensitizers for the desired abnormal addition reaction.

The abnormal addition reaction between the defined compounds according to the process of the present invention may be effected in the vapor or liquid phase, or in a two-phase liquid-vapor system. Since the abnormal addition reaction occurs photo-chemically, or under the influence of catalysts or sensitizers which are dissociated to produce radicals which initiate the reaction, no heating is necessary. In fact, in many instances the reaction, although it may be realized at temperatures of about 25° C., is preferably effected at temperatures which are even below 0° C. Also, it was discovered that the abnormal addition of mercaptans, hydrogen sulfide or hydrogen halides (e. g. hydrogen bromide), when the reaction is effected under the influence of the above-defined class of catalysts or sensitizers, proceeds regardless of the presence or absence of a liquid film in the reaction zone. Although the reaction described herein may be promoted or effected by using the whole range of ultra-violet radiations, it has been pointed out above that the presence of the defined catalysts or sensitizers (which, incidentally, do not have a detrimental effect on the reactants) eliminates the necessity of using radiations having very short wave-lengths. In other words, whereas abnormal addition of, for example, hydrogen bromide to an unsaturated organic compound would require ultra-violet radiations having wave-lengths of below about 2900 to 3000 Angstrom units, the addition of even small amounts of a compound of the class of catalyst or sensitizer defined above permits effective addition even when the radiations have longer wave-lengths, provided such rays will cause the initial dissociation of the catalyst or sensitizer, thereby initiating the chain mechanism, and at the same time directionally controlling the addition reaction.

The abnormal reaction according to the present process may be effected in a batch, intermittent or continuous manner. When the process is executed batchwise, the reactants, together with a suitable amount of the catalyst or sensitizer of the defined class, may be conveyed under any suitable or optimum pressure and temperature into a suitable container which is then illuminated, preferably with ultra-violet light, for a period of time sufficient to effect the desired addition reaction. Although containers of quartz or the like may be employed, so as to permit light waves of between 2900 and 3000 Angstrom units therethrough, it is possible to employ ordinary glass or Pyrex glass, since wave-lengths passing through this type of glass will also dissociate the sensitizer or catalyst and thus initiate and effect the desired reaction.

Although there is no intention of being limited by any details therein, the following illustrative examples represent specific embodiments of the present invention.

*Example I*

Pure propylene, which was carefully fractionated to separate it from other gases, was introduced into a Pyrex glass container which was first subjected to a high vacuum to remove substantially all of the gases therefrom. The propylene gas was introduced until the pressure in the container was equal to 102.3 mm. of mercury pressure. Thereafter hydrogen bromide gas was introduced into the same container for an additional 102.7 mm. of mercury pressure. The mixture was maintained at a temperature of about 25° C. and was subjected to ultra-violet radiations from a quartz mercury lamp. Although this irradiation was continued for about 25 minutes, the pressure in the container remained substantially unchanged, thus indicating that substantially no reaction occurred. On the other hand, when acetone, in an amount of 2.5 mol percent, was added to propylene and hydrogen bromide, and the mixture was then subjected to the same treatment and under the same conditions as those described above, the pressure at the end of about 30 minutes dropped down to approximately 115 mm. of mercury pressure, thus indicating that the presence of the small amount of acetone caused the reaction of about 80% of the propylene with the hydrogen bromide. An analysis of the reaction product showed that it was predominantly normal propyl bromide, i. e. a product of abnormal addition.

*Example II*

Equimolecular amounts of propylene and hydrogen bromide were mixed together with acetone in an amount equal to 0.85 mol percent, the gaseous mixture being then subjected in a Pyrex glass container at a temperature of about 25° C. to radiations from a quartz mercury lamp for a period of about five minutes. The analysis of the reaction product showed that about 60% of the propylene was hydrobrominated, thus forming a product having an index of refraction equal to $N_D^{20}$ 1.4340, thus showing that this product was predominantly normal propyl bromide.

A similar experiment was conducted in which the acetone was employed in an amount equal to about 9.0 mol percent. At the end of five minutes irradiation, approximately 85% of the propylene was found to have been hydrobrominated to normal propyl bromide. In this connection it must be noted that generally the presence of relatively large amounts of acetone form a somewhat unstable condensation product which is believed to be the hydrobromide of mesityl oxide, this product apparently not being dependent for its formation upon any illumination. The compound readily evolves hydrogen bromide upon heating.

*Example III*

Pure propylene was introduced into an evacuated Pyrex glass container until the pressure in the container was equal to 101.6 mm. of mercury pressure. Thereafter hydrogen bromide gas was introduced into the same container for an additional 100.7 mm. of mercury pressure. After the addition of acetaldehyde in an amount equal to about 6.9 mm. the mixture was subjected, at a temperature of about 25° C. and for a period of about three minutes, to ultra-violet radiations from a quartz mercury lamp. The drop in pressure indicated that approximately 60% of the propylene was hydrobrominated via abnormal addition. It is to be noted that the illumination of a mixture of propylene and hydrogen bromide for a period of 25 minutes in the absence of the acetaldehyde caused substantially no drop in pressure.

*Example IV*

Propylene and hydrogen sulfide were introduced in a liquid state and in equal volumetric proportions into a Pyrex glass reactor. The reaction vessel was then sealed and illuminated for a period of about six minutes by radiation emanating from a quartz mercury lamp. The reactor was maintained at a temperature of about 0° C. An analysis of the contents from the reactor showed that only about 4% of the propylene reacted.

*Example V*

The experiment described in Example IV was repeated. However, prior to the sealing of the reactor, acetone was added in such an amount that the volumetric ratio of propylene, hydrogen sulfide and acetone in the reactor was 7.4:7.4:1. After the six-minute illumination the reaction mixture was distilled to evaporate the unreacted compounds. It was then found that about 75% of the propylene reacted via abnormal addition, the reaction product consisting of about 80 weight percent of normal propyl mercaptan and about 20 weight percent of di-n-propyl sulfide.

Without any intention of being limited by any theory of the case, it is believed that the illumination of the reaction mixtures containing the carbonylic compounds described above causes the formation of radicals by the decomposition of the carbonylic compound. These radicals in turn react with the hydrogen bromide to liberate free bromine atoms which in turn react with the unsaturated organic compound. Therefore it is apparently possible to catalyze the above reaction by introducing small amounts of bromine. However, this compound usually results in a reaction product containing excessive proportions of the corresponding di-bromide.

Although the above experiments were conducted with hydrogen sulfide and hydrogen bromide, it is to be understood that the invention is applicable to the abnormal addition of hydrogen halides as well as mercaptans. Of the halides, however, the invention finds particular applicability to the reactions involving the addition of hydrogen bromide. Also, although propylene was used in the above examples, the present invention may be applied to the treatment of the whole class of unsaturated organic compounds described in greater detail hereinabove.

We claim as our invention:

1. In a process of producing normal propyl bromide, the steps of adding acetone to hydrogen bromide and propylene and effecting the reaction between said propylene and hydrogen bromide in a gaseous state at a temperature not in excess of about 25° C. and under the deliberate influence of radiations above 3000 Angstrom units but capable of dissociating acetone.

2. In a process of producing normal propyl bromide the steps of adding acetaldehyde to hydrogen bromide and propylene and effecting the reaction between said propylene and hydrogen bromide in a gaseous state at a temperature not in excess of about 25° C. and under the deliberate influence of radiations above 3000 Angstrom units but capable of dissociating acetaldehyde.

3. In a process of producing normal propyl bromide the steps of mixing hydrogen bromide, propylene and acetone and effecting the reaction at a temperature not in excess of about 25° C. and under the deliberate influence of radiations above 3000 Angstrom units but capable of dissociating acetone.

4. In a process of effecting abnormal hydrohalogenation by the addition of hydrogen halide to an aliphatic hydrocarbon containing an alpha unsaturated linkage the steps of adding an aliphatic ketone to the reaction mass and effecting the reaction in the absence of peroxides, at a temperature not in excess of about 25° C. and under the deliberate influence of radiations above 3000 Angstrom units but capable of dissociating the aliphatic ketone.

5. In a process of effecting an abnormal hydrohalogenation by the addition of a hydrogen halide to an aliphatic hydrocarbon containing an alpha unsaturated linkage the step of adding an aldehyde to the reaction mass and effecting the reaction photochemically, in the absence of peroxides and under the deliberate influence of radiations above 3000 Angstrom units but capable of dissociating the aldehyde.

6. In a process of effecting abnormal hydrohalogenation by the addition of a hydrogen halide to an unsaturated hydrocarbon containing an unsaturated linkage between two carbon atoms having a dissimilar number of hydrogen atoms attached thereto, the steps of adding a carbonylic compound selected from the class consisting of ketones, aldehydes, and acid halides to the reaction mass and effecting the reaction photochemically, in the absence of peroxides and under the deliberate influence of radiations above 3000 Angstrom units but capable of dissociating the carbonylic compound.

7. In a process for effecting reactions via abnormal addition the steps of reacting an unsaturated organic compound containing an unsaturated linkage between two carbon atoms having a dissimilar number of hydrogen atoms attached thereto, with a hydrogen halide in the presence of a carbonylic compound selected from the class consisting of ketones, aldehydes and acid halides and effecting the reaction photochemically, in the absence of peroxides and under the deliberate influence of radiations above 3000 Angstrom units but capable of dissociating said carbonylic compound.

8. In a process of reacting propylene with hydrogen bromide wherein the reaction would ordinarily occur via normal addition to produce predominantly isopropyl bromide, the improvement which comprises directionally controlling the reaction to produce predominantly normal propyl bromide by adding a minor amount of acetone to the reactants and subjecting the mixture at a temperature not in excess of about 25° C. to the action of light having wave-lengths above 3000 Angstrom units but capable of dissociating the acetone.

WILLIAM E. VAUGHAN.
FREDERICK F. RUST.